/ 350-414
OR 4,037,934

United States Patent [19]
Matsubara

[11] 4,037,934
[45] July 26, 1977

[54] MICROSCOPE OBJECTIVE

[75] Inventor: Masaki Matsubara, Hachiouji, Japan

[73] Assignee: Olympus Optical Co., Ltd., Tokyo, Japan

[21] Appl. No.: 630,899

[22] Filed: Nov. 11, 1975

[30] Foreign Application Priority Data
Nov. 15, 1974 Japan .................. 49-131140

[51] Int. Cl.² ............................... G02B 21/02
[52] U.S. Cl. .................... 350/175 ML; 350/216
[58] Field of Search .............. 350/175 ML, 216

[56] References Cited
U.S. PATENT DOCUMENTS 3,592,530 7/1971 Klein .................... 350/216
3,879,111 4/1975 Goto .................... 350/175 ML Primary Examiner—John K. Corbin
Assistant Examiner—Conrad Clark
Attorney, Agent, or Firm—Cushman, Darby & Cushman

[57] ABSTRACT

A high magnification microscope objective having a very large numerical aperture which comprises a first positive lens component, a second positive lens component, a third cemented lens component having positive refractive power, a fourth positive lens component and a fifth cemented lens component, and wherein chromatic aberration, curvature of field, etc. are favorably corrected.

6 Claims, 28 Drawing Figures

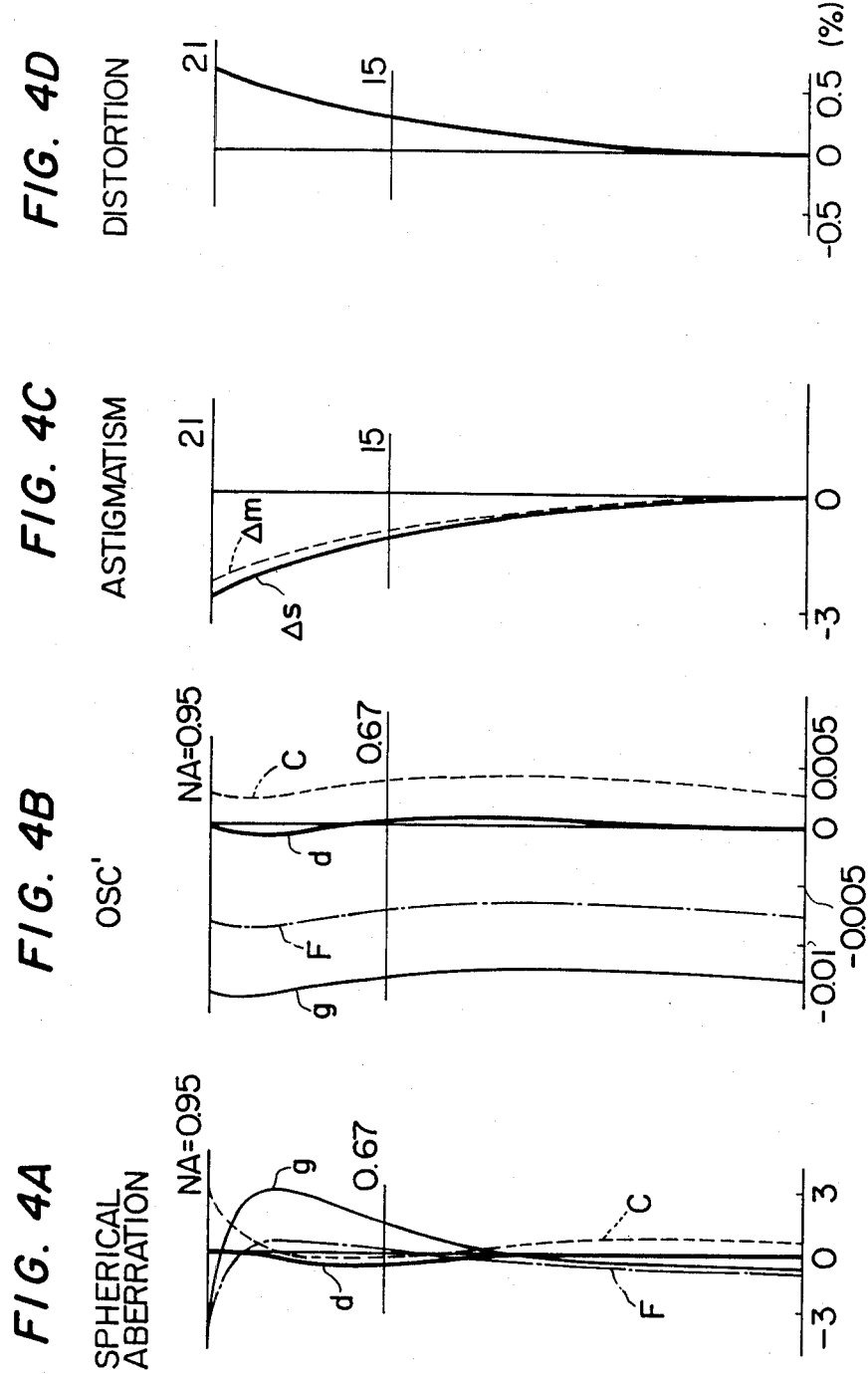

COMA

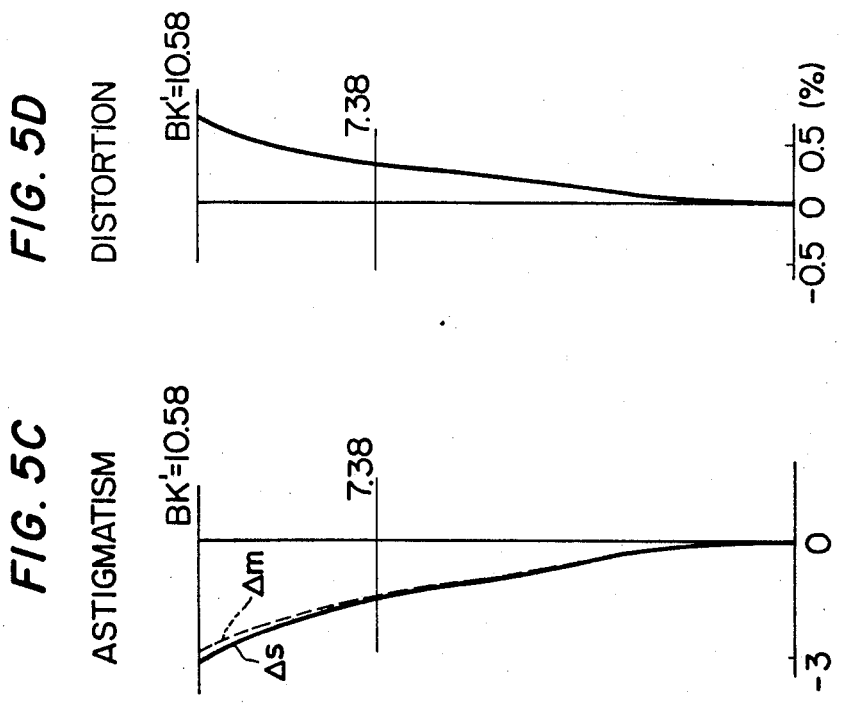
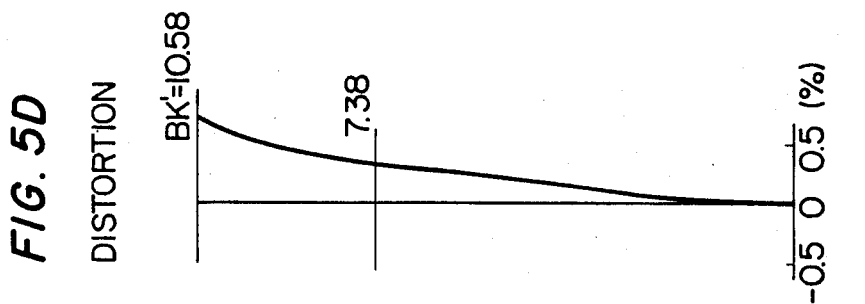
FIG. 5A SPHERICAL ABERRATION
FIG. 5B OSC'
FIG. 5C ASTIGMATISM
FIG. 5D DISTORTION

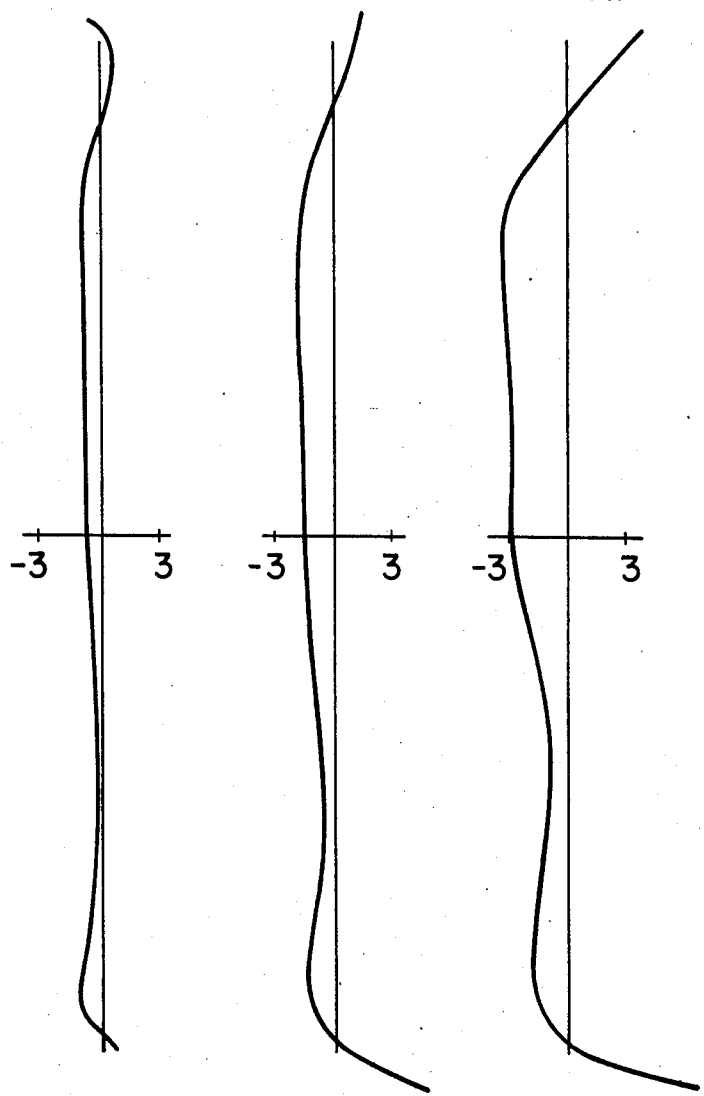

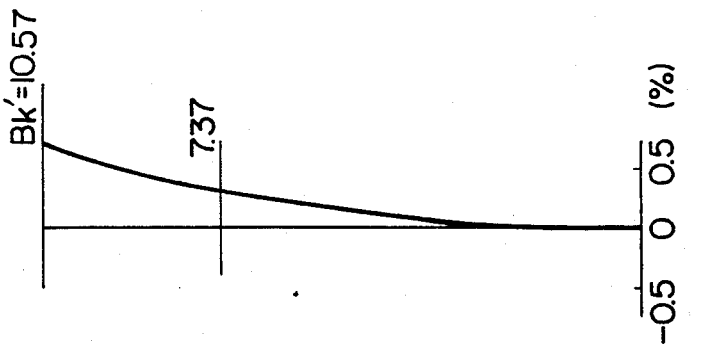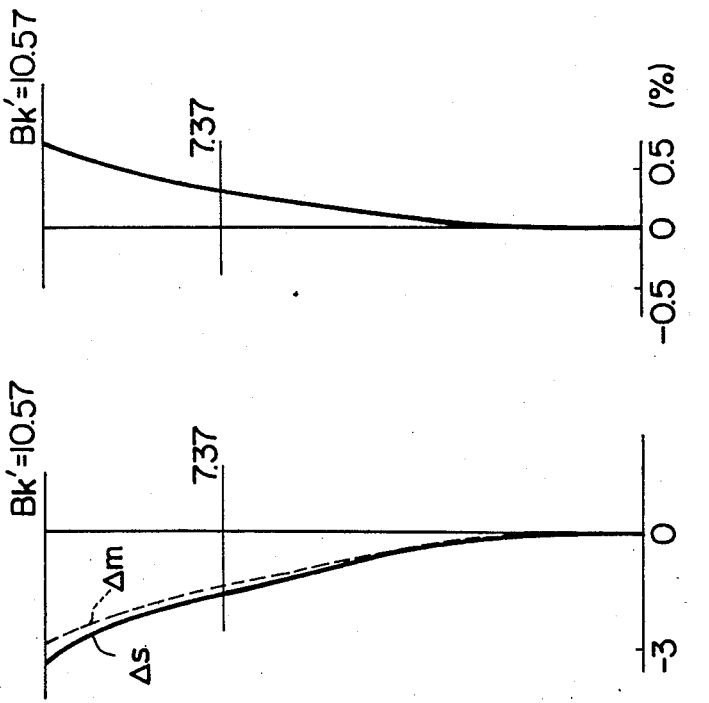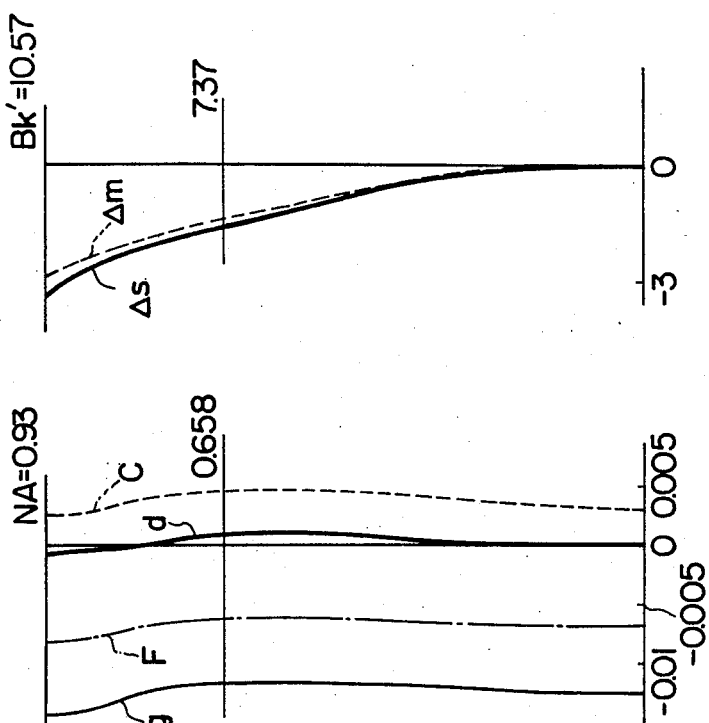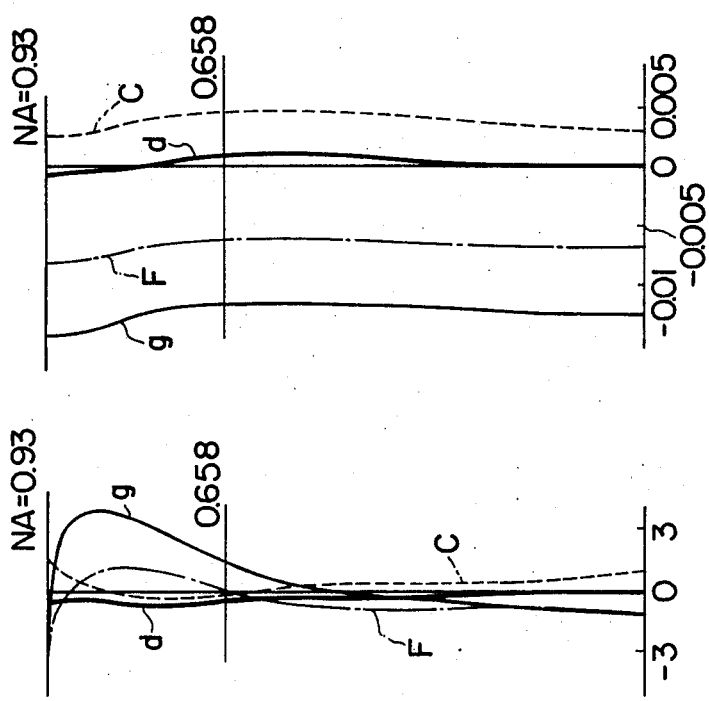

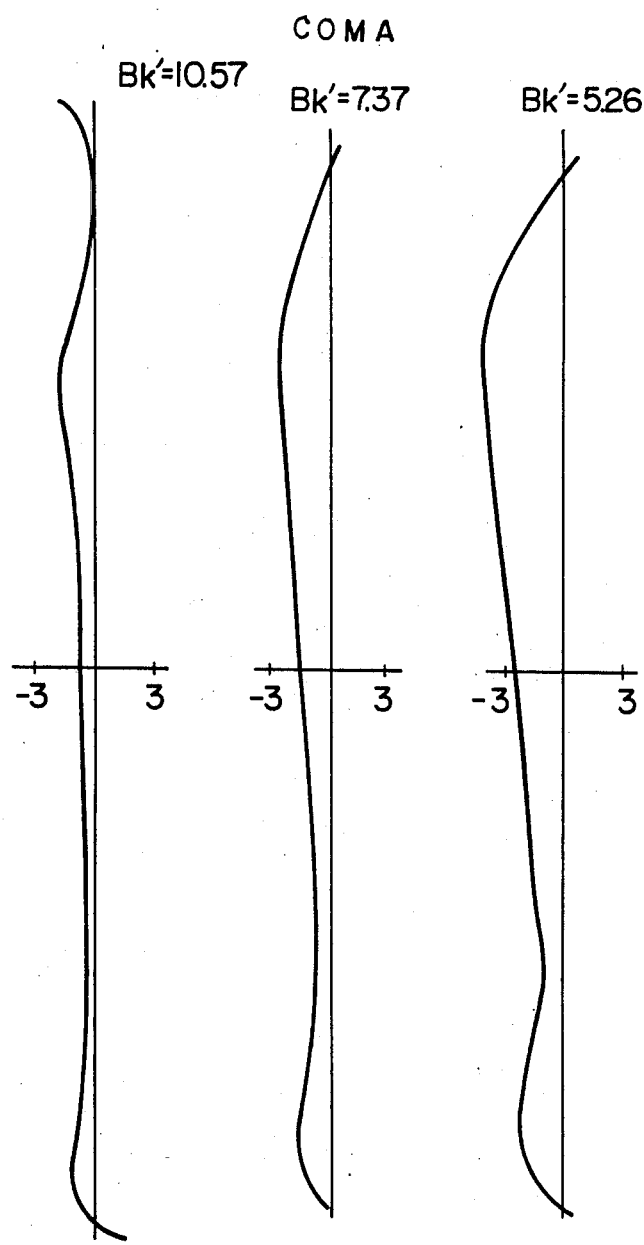

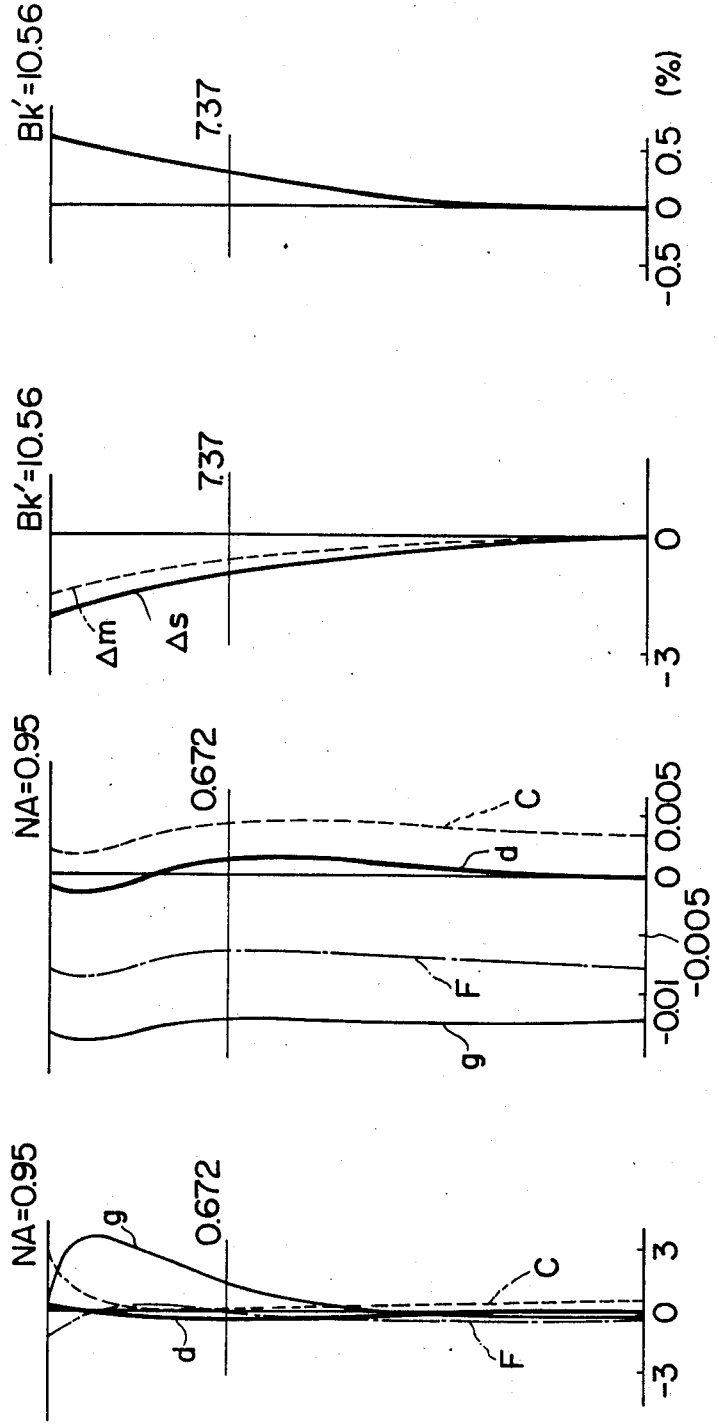
FIG. 7A SPHERICAL ABERRATION
FIG. 7B OSC'
FIG. 7C ASTIGMATISM
FIG. 7D DISTORTION

COMA

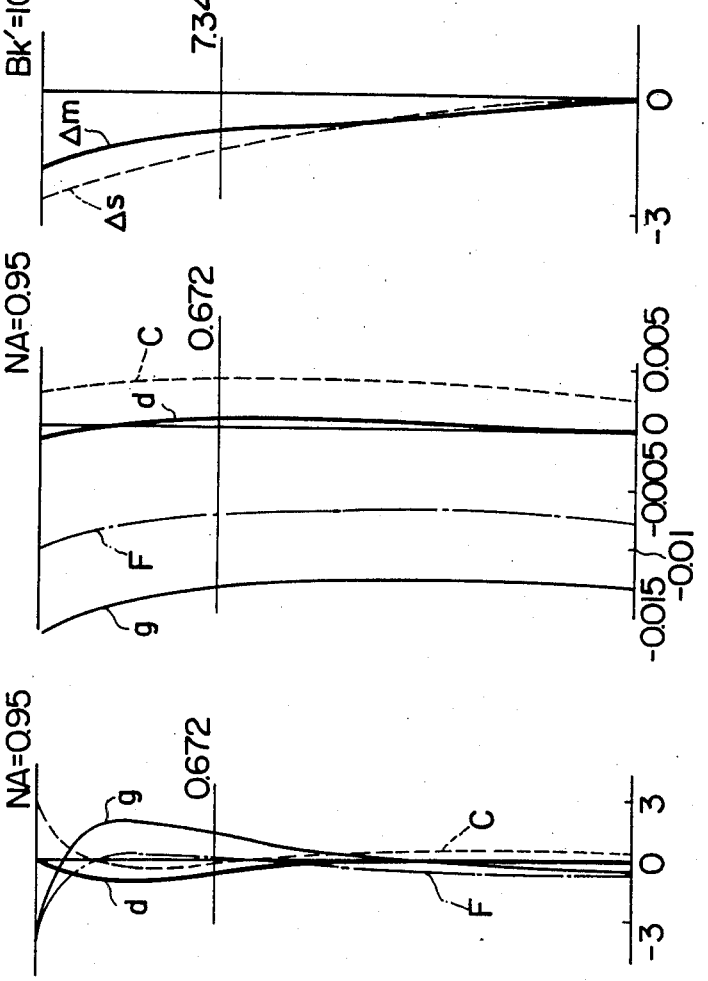

COMA

MICROSCOPE OBJECTIVE

BACKGROUND OF THE INVENTION a. Field of the Invention

The present invention relates to a high magnification (50× to 70×) microscrope objective wherein longitudinal chromatic aberration is completely corrected to a degree similar to that in a semiapochromat objective especially over a large numerical aperture of 0.95 and curvature of field is also favourably corrected.

b. Description of the Prior Art

Conventional microscope objective having magnification of 60× or so were not satisfactory in their performance since they had numerical apertures of 0.7 to 0.8 and their chromatic aberration was corrected only to the degree similar to that in an ordinary apochromat. In such circumstances, it has been strongly desired to develop a microscrope objective having higher performance. Although there were available microscope objective having numerical apertures larger than 1.0 and wherein chromatic aberration was corrected, such objective were liquid immersions and required tedious operating procedures.

SUMMARY OF THE INVENTION

A general object of the present invention is to provide a high magnification microscope objective having a large numerical aperture and wherein aberrations such as chromatic aberration, curvature of field, etc. have been favourably corrected.

The microscope objective according to the present invention comprises a front lens group and a rear lens group with an appropriate airspace interposed therebetween; the front lens group comprising a first relatively thick meniscus lens component having positive power, a second positive meniscus lens component and a third cemented achromatic lens component having positive power as a whole, and the rear lens group comprising a fourth positive lens component and a fifth cemented achromatic lens component.

The microscope objective according to the present invention satisfies the following conditions:

$$n_1 > 1.70, \nu_1 > 45 \qquad (1)$$

$$r_a > 0 \qquad (2)$$

$$3f < \frac{r_b}{n_b - 1} \qquad (3)$$

$$5.9 < \frac{f_{II}}{f_I} < 20 \qquad (4)$$

wherein the reference symbols represent as defined below:

$n_1$: refractive index of the first lens component
$\nu_1$: Abbe's number of the first lens component
$r_a$: radius of curvature of one cemented surface in the third lens component
$r_b$: radius of curvature of the surface located nearest the image of the fifth lens component
$n_b$: refractive index of the lens element nearest the image of the fifth lens component
$f_I$: focal length of the front lens group
$f_{II}$: focal length of the rear lens group In the microscope objective according to the present invention, the first lens component is made of a glass material which has high refractive index as defined in condition (1) for controlling as low as possible the spherical aberration produced by enlarging aperture of the objective and which has low dispersive power for minimizing chromatic aberration. This condition is therefore effective for relieving the second and later lens components from excessive burdens to correct spherical and chromatic aberrations. As will be described later with reference to preferred embodiments of the present invention, the first lens component is made relatively thick so as to have a small Petzval's sum for correcting curvature of field. If, however, the first lens component is too thick, astigmatism, longitudinal chromatic aberration and lateral chromatic aberration will be remarkably aggravated. It is therefore necessary to make the first lens component in an appropriate thickness taking the aberrations mentioned above ito consideration.

The second positive meniscus lens component is made of crystals of fluorite or the similar material which has a very low dispersing power for further correcting chromatic aberration. The focal lengths and curvatures of the first and second lens components respectively are so designed as to satisfy aplanatic condition with regard to the rays emitted from an axial object point. Used as the third lens component is a cemented lens component having relatively high power which is made of crystals of fluorite or the similar material which shows extraordinary dispersion at low dispersion for further correcting longitudinal chromatic aberration and simultaneously eliminating secondary spectrum, thereby designing the third lens component which is quite similar to a semiapochromat. In addition, one of the cemented surface of the third lens component has a convex face on the object side for favorably correcting spherical aberration and coma.

With an appropriate airspace from the third lens component, there are arranged the fourth positive lens component with low dispersing power and the fifth cemented lens component for correcting spherical and chromatic aberrations further favorably. The final surface of the fifth lens component has a convex face on the object side so that the principal plane of the entire lens system is shifted forward for offering a work distance as long as possible by preventing a large aperture and high magnification from shortening the work distance. This surface has a capability to correct Petzval's sum so that the microscope objective can correct curvature of field and offer clear and sharp images in a range wider than the conventional microscop objective.

Further, spherical aberration, longitudinal chromatic aberration and lateral chromatic aberrations are corrected in a well balanced condition since refractive powers are properly balanced between the front and rear lens groups of the microscope objective according to the present invention. Furthermore, it is possible to correct the aberrations more favorably by arranging an appropriate airspace between the front and rear lens groups of the microscope objective according to the present invention.

In view of the conceptions described above, the composition and conditions of the microscope objective according to the present invention have been selected. Now, the significance of the selected conditions will be described consecutively below:

Condition (1) is required for favorably correcting spherical aberration, longitudinal and lateral chromatic aberrations produced in a large aperture by using a glass material having high refractive power and low dispersing power for the first lens component. If $n_I$ is smaller than 1.70 in condition (1), spherical aberration can not be corrected sufficiently and can hardly be corrected by the later lens component. If $\nu_I$ is smaller than 45, it becomes impossible to correct longitudinal and lateral chromatic aberrations at the same time in the entire lens system.

Condition (2) is required for obtaining a proper balance among coma, spherical aberration and longitudinal chromatic aberration by arranging a convex surface on the object side in the third cemented lens component. If this surface is concave on the object side, coma and spherical aberration are aggravated remarkably and can not be corrected by the later lens components.

Condition (3) is effective for prolonging work distance and correcting Petzval's sum. If $r_b/(n_b - 1)$ is smaller than $3f$, radius of curvature of the surface on the image side of the fifth lens component becomes shorter to prolong the work distance and reduce Petzval's sum but spherical aberration is produced. If, however, $r_b/(n_b - 1)$ has a negative value and said surface is convex on the image side, it is impossible to obtain the required work distance and correct curvature of field.

Finally, condition (4) defines the relative ranges of the total focal lengths of the front and rear lens groups. If $f_{II}/f_I$ exceeds the upper limit of condition (4), the rear lens groups has a refractive power too low to correct spherical aberration. If $f_{II}/f_I$ is smaller than the lower limit of condition (4), on the other hand, the front lens group has a refractive power too low to correct spherical and chromatic aberrations sufficiently, making it impossible to design a microscope objective wherein aberrations are corrected to the degree of those in a semiapochromat.

In addition to the above-mentioned four conditions, it is desirable to select the airspace $d_a$ between the front and rear lens groups within a range:

5. $0.03f < d_a < 1.5f$ for correcting chromatic aberration and coma further favorably.

BRIEF DESCRIPTION OF THE DRAWINGS

FIG. 4A through FIG. 4E illustrate curves showing the aberration characteristic of the embodiment 1;

FIG. 5A through FIG. 5E illustrate graphs showing the aberration characteristic of the embodiment 2;

FIG. 6A through FIG. 6E show curves illustrating the aberration characteristic of the embodiment 3;

FIG. 7A through FIG. 7E show graphs illustrating the aberration characteristic of the embodiment 4; and FIG. 8A through FIG. 8E illustrate curves showing the aberration characteristic of the embodiment 5.

DETAILED DESCRIPTION OF THE PREFERRED EMBODIMENTS

Figure 1:
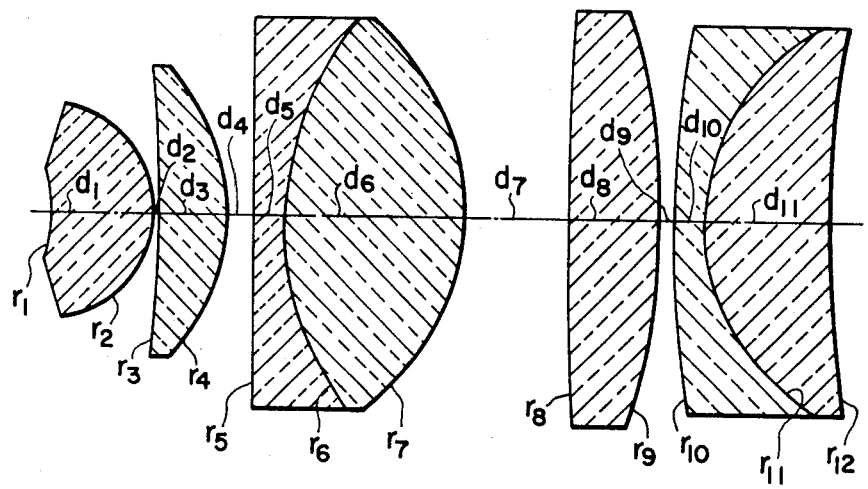
FIG. 1 is a sectional view illustrating the composition of the embodiments 1 through 3.

Now, some numerical data of the microscope objective according to the present invention will be exemplified below:

Embodiment 1

$f = 1.0$, NA $= 0.95$, WD $= 0.107$

| | | | |
|---|---|---|---|
| $r_1 = -0.704$ | | | |
| | $d_1 = 0.59$ | $n_1 = 1.774$ | $\nu_1 = 49.4$ |
| $r_2 = -0.591$ | | | |
| | $d_2 = 0.017$ | | |
| $r_3 = -5.722$ | | | |
| | $d_3 = 0.417$ | $n_2 = 1.4339$ | $\nu_2 = 95.2$ |
| $r_4 = -1.164$ | | | |
| | $d_4 = 0.156$ | | |
| $r_5 = 21.330$ | | | |
| | $d_5 = 0.139$ | $n_3 = 1.74$ | $\nu_3 = 28.3$ |
| $r_6 = 1.755$ | | | |
| | $d_6 = 1.077$ | $n_4 = 1.4339$ | $\nu_4 = 95.2$ |
| $r_7 = -1.396$ | | | |
| | $d_7 = 0.78$ | | |
| $r_8 = 16.383$ | | | |
| | $d_8 = 0.933$ | $n_5 = 1.618$ | $\nu_5 = 63.4$ |
| $r_9 = -8.101$ | | | |
| | $d_9 = 0.069$ | | |
| $r_{10} = 5.787$ | | | |
| | $d_{10} = 0.174$ | $n_6 = 1.618$ | $\nu_6 = 63.4$ |
| $r_{11} = 1.212$ | | | |
| | $d_{11} = 0.764$ | $n_7 = 1.487$ | $\nu_7 = 84.5$ |
| $r_{12} = 7.543$ | | | |

$$\frac{r_b}{n_b - 1} = 15.5, \quad \frac{f_{II}}{f_I} = 17.6$$

Embodiment 2

$f = 1.0$, NA $= 0.95$, WD $= 0.1$

| | | | |
|---|---|---|---|
| $r_1 = -0.809$ | | | |
| | $d_1 = 0.607$ | $n_1 = 1.774$ | $\nu_1 = 49.4$ |
| $r_2 = -0.624$ | | | |
| | $d_2 = 0.017$ | | |
| $r_3 = -5.270$ | | | |
| | $d_3 = 0.451$ | $n_2 = 1.449$ | $\nu_2 = 95.2$ |
| $r_4 = -1.182$ | | | |
| | $d_4 = 0.087$ | | |
| $r_5 = -10.419$ | | | |
| | $d_5 = 0.139$ | $n_3 = 1.74$ | $\nu_3 = 31.7$ |
| $r_6 = 1.993$ | | | |
| | $d_6 = 1.075$ | $n_4 = 1.449$ | $\nu_4 = 95.2$ |
| $r_7 = -1.352$ | | | |
| | $d_7 = 0.069$ | | |
| $r_8 = 11.541$ | | | |
| | $d_8 = 0.346$ | $n_5 = 1.4866$ | $\nu_5 = 84.5$ |
| $r_9 = -5.366$ | | | |
| | $d_9 = 1.157$ | | |
| $r_{10} = 5.488$ | | | |
| | $d_{10} = 0.173$ | $n_6 = 1.618$ | $\nu_6 = 63.4$ |
| $r_{11} = 1.236$ | | | |
| | $d_{11} = 0.763$ | $n_7 = 1.4866$ | $\nu_7 = 84.5$ |
| $r_{12} = 10.218$ | | | |

$$\frac{r_b}{n_b - 1} = 21, \quad \frac{f_{II}}{f_I} = 8.6$$

Embodiment 3

$f = 1.0$, NA $= 0.95$, WD $= 0.094$

| | | | |
|---|---|---|---|
| $r_1 = -0.819$ | | | |
| | $d_1 = 0.587$ | $n_1 = 1.774$ | $\nu_1 = 49.4$ |
| $r_2 = -0.604$ | | | |
| | $d_2 = 0.017$ | | |
| $r_3 = -10.335$ | | | |
| | $d_3 = 0.414$ | $n_2 = 1.487$ | $\nu_2 = 84.5$ |
| $r_4 = -1.219$ | | | |
| | $d_4 = 0.155$ | | |
| $r_5 = -11.338$ | | | |
| | $d_5 = 0.138$ | $n_3 = 1.74$ | $\nu_3 = 31.7$ |
| $r_6 = 1.723$ | | | |
| | $d_6 = 1.07$ | $n_4 = 1.4339$ | $\nu_4 = 95.2$ |
| $r_7 = -1.303$ | | | |
| | $d_7 = 0.069$ | | |
| $r_8 = 71.639$ | | | |
| | $d_8 = 0.380$ | $n_5 = 1.618$ | $\nu_5 = 63.4$ |
| $r_9 = -5.536$ | | | |
| | $d_9 = 0.518$ | | |
| $r_{10} = 6.840$ | | | |
| | $d_{10} = 0.173$ | $n_6 = 1.618$ | $\nu_6 = 63.4$ |
| $r_{11} = 1.253$ | | | |
| | $d_{11} = 0.759$ | $n_7 = 1.486$ | $\nu_7 = 84.5$ |

-continued $r_{12} = 21.664$ $$\frac{r_b}{n_b - 1} = 44.5, \quad \frac{f_{II}}{f_I} = 15.6$$

Embodiment 4

$f = 1.0, NA = 0.95, WD = 0.129$

| | | |
|---|---|---|
| $r_1 = -0.911$ | | |
| $d_1 = 0.598$ | $n_1 = 1.774$ | $\nu_1 = 49.4$ |
| $r_2 = -0.704$ | | |
| $d_2 = 0.019$ | | |
| $r_3 = -4.929$ | | |
| $d_3 = 0.394$ | $n_2 = 1.434$ | $\nu_2 = 95.2$ |
| $r_4 = -1.113$ | | |
| $d_4 = 0.179$ | | |
| $r_5 = -7.246$ | | |
| $d_5 = 0.239$ | $n_3 = 1.689$ | $\nu_3 = 31.1$ |
| $r_6 = 2.17$ | | |
| $d_6 = 0.837$ | $n_4 = 1.487$ | $\nu_4 = 84.5$ |
| $r_7 = -1.553$ | | |
| $d_7 = 0.048$ | | |
| $r_8 = 8.052$ | | |
| $d_8 = 0.478$ | $n_5 = 1.618$ | $\nu_5 = 63.4$ |
| $r_9 = -3.59$ | | |
| $d_9 = 0.359$ | | |
| $r_{10} = 9.768$ | | |
| $d_{10} = 0.263$ | $n_6 = 1.618$ | $\nu_6 = 63.4$ |
| $r_{11} = 1.143$ | | |
| $d_{11} = 0.956$ | $n_7 = 1.434$ | $\nu_7 = 95.2$ |
| $r_{12} = -3.255$ | | |
| $d_{12} = 0.263$ | $n_8 = 1.487$ | $\nu_8 = 70.2$ |
| $r_{13} = 45.024$ | | |

$$\frac{r_b}{n_b - 1} = 92.36, \quad \frac{f_{II}}{f_I} = 5.96$$

Embodiment 5

$f = 1.0, NA = 0.95, WD = 0.113$

| | | |
|---|---|---|
| $r_1 = -0.0687$ | | |
| $d_1 = 0.607$ | $n_1 = 1.774$ | $\nu_1 = 49.4$ |
| $r_2 = -0.59$ | | |
| $d_2 = 0.019$ | | |
| $r_3 = -3.657$ | | |
| $d_3 = 0.428$ | $n_2 = 1.434$ | $\nu_2 = 95.2$ |
| $r_4 = -1.167$ | | |
| $d_4 = 0.19$ | | |
| $r_5 = -5.948$ | | |
| $d_5 = 0.19$ | $n_3 = 1.667$ | $\nu_3 = 33.0$ |
| $r_6 = 1.979$ | | |
| $d_6 = 1.0$ | $n_4 = 1.434$ | $\nu_4 = 95.2$ |
| $r_7 = -1.204$ | | |
| $d_7 = 0.262$ | $n_5 = 1.613$ | $\nu_5 = 43.8$ |
| $r_8 = -1.448$ | | |
| $d_8 = 0.071$ | | |
| $r_9 = 7.937$ | | |
| $d_9 = 0.547$ | $n_6 = 1.618$ | $\nu_6 = 63.4$ |
| $r_{10} = -6.486$ | | |
| $d_{10} = 0.094$ | | |
| $r_{11} = 2.347$ | | |
| $d_{11} = 0.19$ | $n_7 = 1.639$ | $\nu_7 = 44.9$ |
| $r_{12} = 1.218$ | | |
| $d_{12} = 0.785$ | $n_8 = 1.487$ | $\nu_8 = 84.5$ |
| $r_{13} = 1.786$ | | |

$$\frac{r_b}{n_b - 1} = 3.67, \quad \frac{f_{II}}{f_I} = 7.033$$

Figure 2:
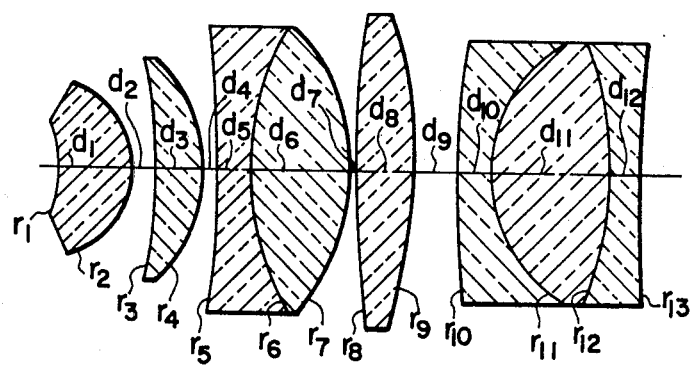
FIG. 2 is a sectional view illustrating the composition of the embodiment 4.
Figure 3:
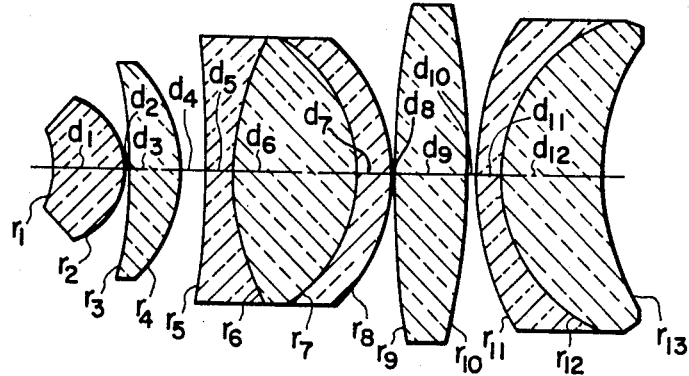
FIG. 3 is a sectional view showing the composition of the embodiment 5.
Figure 4E:
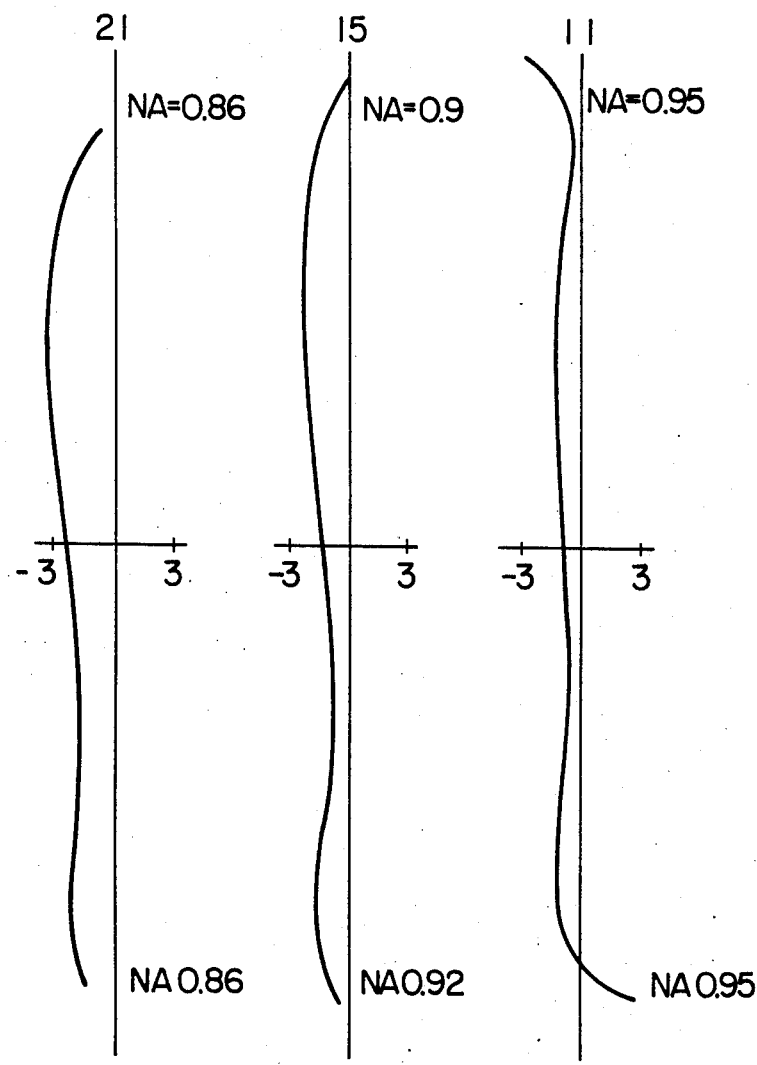
Figure 7E:
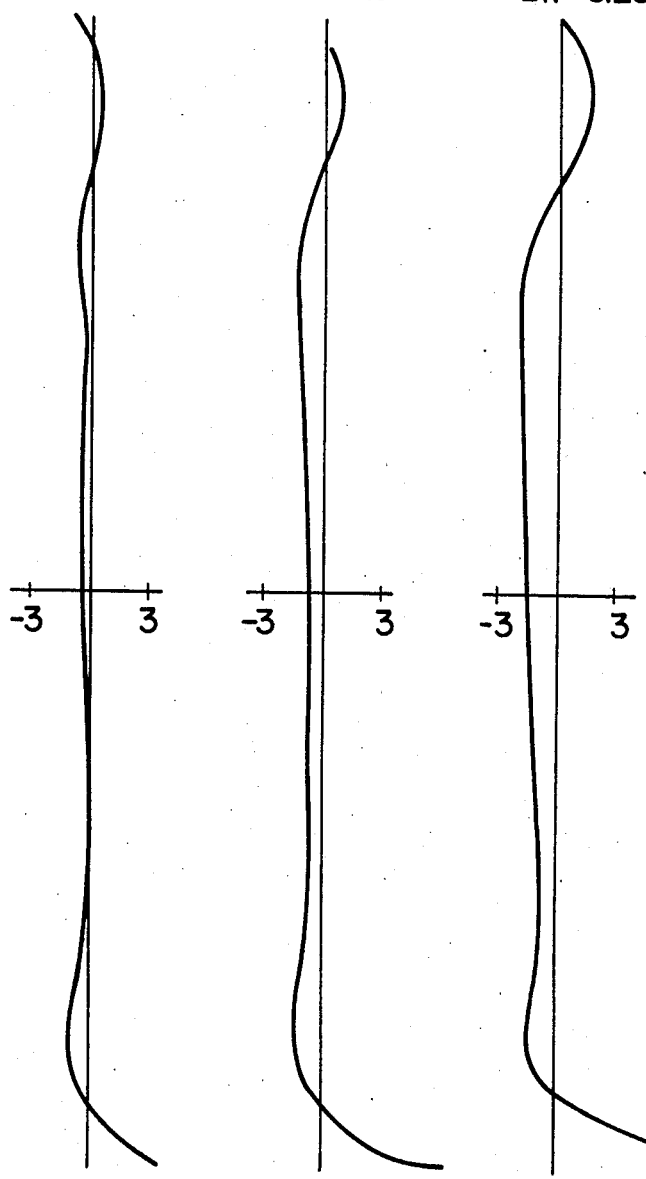
Figure 8E:
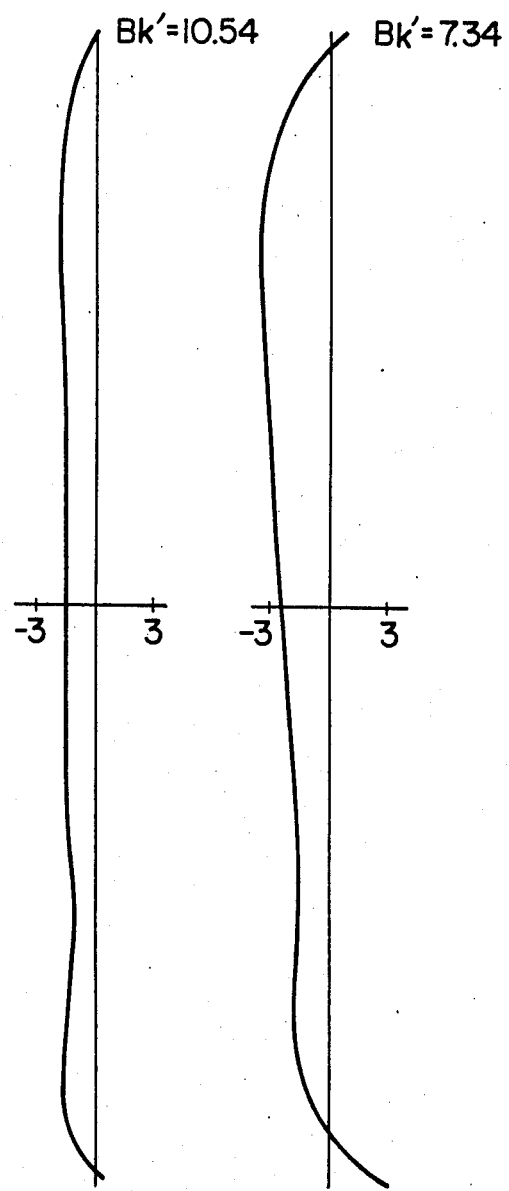

Of the embodiments described above, the embodiments 1 through 3 have a composition as shown in FIG. 1 wherein the third lens component is a cemented doublet comprising a negative lens element and a positive lens element, while the fifth lens component is a cemented doublet comprising a negative meniscus lens element and a positive meniscus lens element, and reference symbol $r_a$ represents $r_6$, reference symbol $r_b$ denotes $r_{12}$ and reference symbol $n_6$ represents $n_7$. In the embodiment 4 shown in FIG. 2, the fifth lens component is a cemented triplet and reference symbol $r_a$ corresponds to $r_6$, reference symbol $r_b$ represents $r_{13}$ and reference symbol $n_b$ denotes $n_8$. In the embodiment 5 illustrated in FIG. 3, the third lens component is a cemented triplet and reference symbol $r_a$ designates $r_6$, reference symbol $r_b$ represents $r_{13}$ and reference symbol $n_b$ denotes $n_8$.

Although the third lens component is exemplified as a cemented doublet or triplet comprising negative, positive and negative lens elements in the above-described embodiments, the third lens component may be a cemented triplet comprising positive, negative and positive lens elements. In such a case, it is possible to obtain the same function as $r_a$ in each embodiment by selecting a negative lens element having concave surface on both sides and making one surface convex on the object side.

I claim:

1. A microscope objective comprising a front lens group and a rear lens group, said front lens group comprising a first positive lens component having a concave surface positioned toward the object side and made of material having a high refractive index and low dispersion, a second positive meniscus lens component made of low dispersion material and a third cemented lens component having positive power and a cemented surface convex toward the object side and comprising a lens made of low dispersion material, said rear lens group comprising a fourth positive lens component made of low dispersion material and a fifth positive cemented lens component having a rear surface convex toward the object side, said microscope objective satisfying the following conditions:

$n_I > 1.77, \nu_I > 49$     (1)
$r_a > 0$     (2)
$3f < (r_b/n_b - 1)$     (3)
$5.9 < f_{II}/f_I < 20$     (4)

wherein reference symbol $n_I$ represents refractive index of the first lens component, reference symbol $\nu_I$ denotes Abbe's number of the first lens component, reference symbol $r_a$ designates radius of curvature of one cemented surface of the third lens component, reference symbol $r_b$ represents radius of curvature of the image side surface of the fifth lens component, reference symbol $n_b$ denotes refractive index of the image side lens element of the fifth lens component, and reference symbols $f$, $f_I$ and $f_{II}$ designate the total focal lengths of the entire lens system, the front lens groups and the rear lens group respectively.

2. A microscope objective comprising a front lens group comprising a first positive lens component, a second positive lens component and a third cemented doublet lens component, and a rear lens group comprising a fourth positive lens component and a fifth cemented doublet lens component, and said microscope objective having the following numerical data:

$f = 1.0, NA = 0.95, WD = 0.107$

| | | |
|---|---|---|
| $r_1 = -0.704$ | | |
| $d_1 = 0.59$ | $n_1 = 1.774$ | $\nu_1 = 49.4$ |
| $r_2 = -0.591$ | | |
| $d_2 = 0.017$ | | |
| $r_3 = -5.722$ | | |
| $d_3 = 0.417$ | $n_2 = 1.4339$ | $\nu_2 = 95.2$ |
| $r_4 = -1.164$ | | |
| $d_4 = 0.156$ | | |
| $r_5 = 21.330$ | | |
| $d_5 = 0.139$ | $n_3 = 1.74$ | $\nu_3 = 28.3$ |
| $r_6 = 1.775$ | | |
| $d_6 = 1.077$ | $n_4 = 1.4339$ | $\nu_4 = 95.2$ |
| $r_7 = -1.396$ | | |
| $d_7 = 0.78$ | | |
| $r_8 = 16.383$ | | |
| $d_8 = 0.933$ | $n_5 = 1.618$ | $\nu_5 = 63.4$ |
| $r_9 = -8.101$ | | |

-continued

|  |  |  |  |
|---|---|---|---|
|  | $d_9 = 0.069$ |  |  |
| $r_{10} = 5.787$ |  |  |  |
|  | $d_{10} = 0.174$ | $n_6 = 1.618$ | $\nu_6 = 63.4$ |
| $r_{11} = 1.212$ |  |  |  |
|  | $d_{11} = 0.764$ | $n_7 = 1.487$ | $\nu_7 = 84.5$ |
| $r_{12} = 7.543$ |  |  |  |

$$\frac{r_b}{n_b - 1} = 15.5, \quad \frac{f_{II}}{f_I} = 17.6$$

3. A microscope objective comprising a front lens group comprising a first positive lens component, a second positive lens component and a third cemented doublet lens component, and a rear lens group comprising a fourth positive lens component and a fifth cemented doublet lens component, and said microscope objective having the following numerical data:

$f = 1.0$, NA $= 0.95$, WD $= 0.1$

|  |  |  |  |
|---|---|---|---|
| $r_1 = -0.809$ |  |  |  |
|  | $d_1 = 0.607$ | $n_1 = 1.774$ | $\nu_1 = 49.4$ |
| $r_2 = -0.624$ |  |  |  |
|  | $d_2 = 0.017$ |  |  |
| $r_3 = -5.270$ |  |  |  |
|  | $d_3 = 0.451$ | $n_2 = 1.449$ | $\nu_2 = 95.2$ |
| $r_4 = -1.182$ |  |  |  |
|  | $d_4 = 0.087$ |  |  |
| $r_5 = -10.419$ |  |  |  |
|  | $d_5 = 0.139$ | $n_3 = 1.74$ | $\nu_3 = 31.7$ |
| $r_6 = 1.993$ |  |  |  |
|  | $d_6 = 1.075$ | $n_4 = 1.449$ | $\nu_4 = 95.2$ |
| $r_7 = -1.352$ |  |  |  |
|  | $d_7 = 0.069$ |  |  |
| $r_8 = 11.541$ |  |  |  |
|  | $d_8 = 0.346$ | $n_5 = 1.4866$ | $\nu_5 = 84.5$ |
| $r_9 = -5.366$ |  |  |  |
|  | $d_9 = 1.157$ |  |  |
| $r_{10} = 5.488$ |  |  |  |
|  | $d_{10} = 0.173$ | $n_6 = 1.618$ | $\nu_6 = 63.4$ |
| $r_{11} = 1.236$ |  |  |  |
|  | $d_{11} = 0.763$ | $n_7 = 1.4866$ | $\nu_7 = 84.5$ |
| $r_{12} = 10.218$ |  |  |  |

$$\frac{r_b}{n_b - 1} = 21, \quad \frac{f_{II}}{f_I} = 8.6$$

4. A microscope objective comprising a front lens group comprising a first positive lens component, a second positive lens component and a third cemented doublet lens component, and a rear lens group comprising a fourth positive lens component and a fifth cemented doublet lens component, and said microscope objective having the following numerical data:

$f = 1.0$, NA $= 0.95$, WD $= 0.094$

|  |  |  |  |
|---|---|---|---|
| $r_1 = -0.819$ |  |  |  |
|  | $d_1 = 0.587$ | $n_1 = 1.774$ | $\nu_1 = 49.4$ |
| $r_2 = -0.604$ |  |  |  |
|  | $d_2 = 0.017$ |  |  |
| $r_3 = -10.335$ |  |  |  |
|  | $d_3 = 0.414$ | $n_2 = 1.487$ | $\nu_2 = 84.5$ |
| $r_4 = -1.219$ |  |  |  |
|  | $d_4 = 0.115$ |  |  |
| $r_5 = -11.338$ |  |  |  |
|  | $d_5 = 0.138$ | $n_3 = 1.74$ | $\nu_3 = 31.7$ |
| $r_6 = 1.723$ |  |  |  |
|  | $d_6 = 1.07$ | $n_4 = 1.4339$ | $\nu_4 = 95.2$ |
| $r_7 = -1.303$ |  |  |  |
|  | $d_7 = 0.069$ |  |  |
| $r_8 = 71.639$ |  |  |  |
|  | $d_8 = 0.380$ | $n_5 = 1.618$ | $\nu_5 = 63.4$ |
| $r_9 = -5.536$ |  |  |  |
|  | $d_9 = 0.518$ |  |  |
| $r_{10} = 6.840$ |  |  |  |
|  | $d_{10} = 0.173$ | $n_6 = 1.618$ | $\nu_6 = 63.4$ |
| $r_{11} = 1.253$ |  |  |  |
|  | $d_{11} = 0.759$ | $n_7 = 1.486$ | $\nu_7 = 84.5$ |
| $r_{12} = 21.664$ |  |  |  |

$$\frac{r_b}{n_b - 1} = 44.5, \quad \frac{f_{II}}{f_I} = 15.6$$

5. A microscope objective comprising a front lens group comprising a first positive lens component, a second positive lens component and a third positive cemented doublet lens component, and a rear lens group comprising a fourth positive lens component and a fifth cemented triplet lens component, and said microscope objective having the following numerical data:

$f = 1.0$, NA $= 0.95$, WD $= 0.129$

|  |  |  |  |
|---|---|---|---|
| $r_1 = -0.911$ |  |  |  |
|  | $d_1 = 0.598$ | $n_1 = 1.774$ | $\nu_1 = 49.4$ |
| $r_2 = -0.704$ |  |  |  |
|  | $d_2 = 0.019$ |  |  |
| $r_3 = -4.929$ |  |  |  |
|  | $d_3 = 0.394$ | $n_2 = 1.434$ | $\nu_2 = 95.2$ |
| $r_4 = -1.113$ |  |  |  |
|  | $d_4 = 0.179$ |  |  |
| $r_5 = -7.246$ |  |  |  |
|  | $d_5 = 0.239$ | $n_3 = 1.689$ | $\nu_3 = 31.1$ |
| $r_6 = 2.17$ |  |  |  |
|  | $d_6 = 0.837$ | $n_4 = 1.487$ | $\nu_4 = 84.5$ |
| $r_7 = -1.553$ |  |  |  |
|  | $d_7 = 0.048$ |  |  |
| $r_8 = 8.052$ |  |  |  |
|  | $d_8 = 0.478$ | $n_5 = 1.618$ | $\nu_5 = 63.4$ |
| $r_9 = -3.59$ |  |  |  |
|  | $d_9 = 0.359$ |  |  |
| $r_{10} = 9.768$ |  |  |  |
|  | $d_{10} = 0.263$ | $n_6 = 1.618$ | $\nu_6 = 63.4$ |
| $r_{11} = 1.143$ |  |  |  |
|  | $d_{11} = 0.956$ | $n_7 = 1.434$ | $\nu_7 = 95.2$ |
| $r_{12} = -3.255$ |  |  |  |
|  | $d_{12} = 0.263$ | $n_8 = 1.487$ | $\nu_8 = 70.2$ |
| $r_{13} = 45.024$ |  |  |  |

$$\frac{r_b}{n_b - 1} = 92.36, \quad \frac{f_{II}}{f_I} = 5.96$$

6. A microscope objective comprising a front lens group comprising a first positive lens component, a second positive lens component and a third cemented triplet lens component, and a rear lens group comprising a fourth positive lens component and a fifth cemented doublet lens component, and said microscope objective having the following numerical data:

$f = 1.0$, NA $= 0.95$, WD $= 0.113$

|  |  |  |  |
|---|---|---|---|
| $r_1 = -0.687$ |  |  |  |
|  | $d_1 = 0.607$ | $n_1 = 1.774$ | $\nu_1 = 49.4$ |
| $r_2 = -0.59$ |  |  |  |
|  | $d_2 = 0.019$ |  |  |
| $r_3 = -3.657$ |  |  |  |
|  | $d_3 = 0.428$ | $n_2 = 1.434$ | $\nu_2 = 95.2$ |
| $r_4 = -1.167$ |  |  |  |
|  | $d_4 = 0.19$ |  |  |
| $r_5 = -5.948$ |  |  |  |
|  | $d_5 = 0.19$ | $n_3 = 1.667$ | $\nu_3 = 33.0$ |
| $r_6 = 1.979$ |  |  |  |
|  | $d_6 = 1.0$ | $n_4 = 1.434$ | $\nu_4 = 95.2$ |
| $r_7 = -1.204$ |  |  |  |
|  | $d_7 = 0.262$ | $n_5 = 1.613$ | $\nu_5 = 43.8$ |
| $r_8 = -1.448$ |  |  |  |
|  | $d_8 = 0.071$ |  |  |
| $r_9 = 7.937$ |  |  |  |
|  | $d_9 = 0.547$ | $n_6 = 1.618$ | $\nu_6 = 63.4$ |
| $r_{10} = -6.486$ |  |  |  |
|  | $d_{10} = 0.094$ |  |  |
| $r_{11} = 2.347$ |  |  |  |
|  | $d_{11} = 0.19$ | $n_7 = 1.639$ | $\nu_7 = 44.9$ |
| $r_{12} = 1.218$ |  |  |  |
|  | $d_{12} = 0.785$ | $n_8 = 1.487$ | $\nu_8 = 84.5$ |
| $r_{13} = 1.786$ |  |  |  |

$$\frac{r_b}{n_b - 1} = 3.67, \quad \frac{f_{II}}{f_I} = 7.033$$

* * * * *